(12) United States Patent
Blankenship et al.

(10) Patent No.: US 11,316,637 B2
(45) Date of Patent: Apr. 26, 2022

(54) PHYSICAL RESOURCE BLOCK ALLOCATION OF PHYSICAL DOWNLINK CONTROL AND DATA CHANNELS

(71) Applicant: Telefonaktiebolaget LM Ericsson (publ), Stockholm (SE)

(72) Inventors: Yufei Blankenship, Kildeer, IL (US); Johan Bergman, Stockholm (SE); Asbjörn Grövlen, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 787 days.

(21) Appl. No.: 15/037,107

(22) PCT Filed: Apr. 11, 2016

(86) PCT No.: PCT/SE2016/050302
§ 371 (c)(1),
(2) Date: May 17, 2016

(87) PCT Pub. No.: WO2016/163942
PCT Pub. Date: Oct. 13, 2016

(65) Prior Publication Data
US 2017/0111152 A1  Apr. 20, 2017

Related U.S. Application Data

(60) Provisional application No. 62/145,287, filed on Apr. 9, 2015.

(51) Int. Cl.
*H04W 4/00* (2018.01)
*H04L 5/00* (2006.01)
(Continued)

(52) U.S. Cl.
CPC .......... *H04L 5/0051* (2013.01); *H04L 1/1861* (2013.01); *H04W 72/042* (2013.01);
(Continued)

(58) Field of Classification Search
CPC ............ H04W 72/042; H04W 72/0453; H04L 1/1861
(Continued)

(56) References Cited

U.S. PATENT DOCUMENTS

2009/0270108 A1* 10/2009 Xu ........................ H04W 24/10
455/452.2
2011/0269407 A1* 11/2011 Koo ........................ H04B 17/27
455/67.11

(Continued)

FOREIGN PATENT DOCUMENTS

CN          104335517 A    2/2015
EP          2747477 A1     6/2014

(Continued)

OTHER PUBLICATIONS

3rd Generation Partnership Project, "3rd Generation Partnership Project; Technical Specification Group Radio Access Network; Evolved Universal Terrestrial Radio Access (E-UTRA); Physical layer procedures (Release 12)", Technical Specification, 3GPP TS 36.213 V12.4.0, Dec. 1, 2014, pp. 1-225, 3GPP, France.

(Continued)

*Primary Examiner* — Thai D Hoang
(74) *Attorney, Agent, or Firm* — Christopher & Weisberg, P. A.

(57) ABSTRACT

Methods and apparatus are disclosed for enabling a narrow-band MTC device to operate in a legacy LTE system having a wider system bandwidth. The physical downlink control channel for a narrow-band MTC device, also referred to as low-complexity physical downlink control channel (LC-PDCCH), has reduced bandwidth resource and can support no more than 6 physical resource blocks. The present application discloses how to allocate physical resource blocks (PRBs) for LC-PDCCH and physical downlink shared channel (PDSCH). The PRB allocation methods (Continued)

disclosed herein allow the MTC devices to derive the frequency location of the PDSCH PRBs from the frequency location of the LC-PDCCH PRBs and to soft-combine LC-PDCCH transmissions and PDSCH transmissions for performance improvement.

20 Claims, 6 Drawing Sheets

(51) Int. Cl.
*H04W 72/04* (2009.01)
*H04L 1/18* (2006.01)
*H04W 4/70* (2018.01)
*H04L 27/26* (2006.01)

(52) U.S. Cl.
CPC ....... *H04W 72/0453* (2013.01); *H04L 5/0044* (2013.01); *H04L 5/0048* (2013.01); *H04L 5/0053* (2013.01); *H04L 5/0094* (2013.01); *H04L 27/2602* (2013.01); *H04W 4/70* (2018.02)

(58) Field of Classification Search
USPC .................................. 370/329–330, 335–345
See application file for complete search history.

(56) References Cited

U.S. PATENT DOCUMENTS

| | | | |
|---|---|---|---|
| 2012/0087442 A1* | 4/2012 | Xu | H04L 5/005 375/299 |
| 2012/0099520 A1 | 4/2012 | Kwon et al. | |
| 2013/0044693 A1 | 2/2013 | Lindh et al. | |
| 2013/0083753 A1 | 4/2013 | Lee et al. | |
| 2013/0336255 A1* | 12/2013 | Gupta | H04W 28/06 370/329 |
| 2014/0071935 A1* | 3/2014 | Papasakellariou | H04L 5/0053 370/330 |
| 2014/0112283 A1* | 4/2014 | Kim | H04L 5/0053 370/329 |
| 2014/0185544 A1* | 7/2014 | Jang | H04L 5/0007 370/329 |
| 2014/0219212 A1 | 8/2014 | Seo et al. | |
| 2014/0341146 A1* | 11/2014 | Nakashima | H04W 72/042 370/329 |
| 2015/0256403 A1 | 9/2015 | Li et al. | |
| 2015/0334683 A1* | 11/2015 | Guo | H04L 5/0035 370/329 |
| 2017/0079019 A1 | 3/2017 | Yang et al. | |
| 2017/0164395 A1* | 6/2017 | Papasakellariou | H04W 72/1273 |

FOREIGN PATENT DOCUMENTS

| | | |
|---|---|---|
| WO | 2014048261 A1 | 4/2014 |
| WO | 2016144220 A1 | 9/2016 |

OTHER PUBLICATIONS

3rd Generation Partnership Project, "3rd Generation Partnership Project; Technical Specification Group Radio Access Network; Evolved Universal Terrestrial Radio Access (E-UTRA); Radio Resource Control (RRC); Protocol specification (Release 12)", Technical Specification, 3GPP TS 36.331 V12.4.1, Dec. 1, 2014, pp. 1-410, 3GPP, France.

Ericsson, et al., "New WI proposal: Further LTE Physical Layer Enhancements for MTC", 3GPP TSG RAN Meeting #65, Edinburgh, Scotland, Sep. 9, 2014, pp. 1-9, RP-141660, 3GPP.

3rd Generation Partnership Project, "3rd Generation Partnership Project; Technical Specification Group Radio Access Network; Study on provision of low-cost Machine-Type Communications (MTC) User Equipments (UEs) based on LTE (Release 12)", Technical Report, 3GPP TR 36.888 V12.0.0, Jun. 1, 2013, pp. 1-55, 3GPP, France.

3rd Generation Partnership Project, "3rd Generation Partnership Project; Technical Specification Group Radio Access Network; Evolved Universal Terrestrial Radio Access (E-UTRA); Physical channels and modulation (Release 12)", 3GPP TS 36.211 V12.4.0, Dec. 1, 2014, pp. 1-124, 3GPP, France.

Nokia Networks, "Physical Downlink Control Channel for MTC", 3GPP-RAN WG1 Meeting #80, Athens, Greece, Feb. 9, 2015, pp. 1-4, R1-150257, 3GPP.

ZTE, "Further Considerations on Physical downlink control channel for MTC enhancement", 3GPP TSG RAN WG1 Meeting #80, Athens, Greece, Feb. 9, 2015, pp. 1-6, R1-150142, 3GPP.

Sony, "MTC Operation with a Narrowband PDCCH", 3GPP TSG-RAN WG1 Meeting #80, Athens, Greece, Feb. 9, 2015, pp. 1-15, R1-150428, 3GPP.

Sony, "Resource granularity of NC-PDCCH and ePDCCH for MTC", 3GPP TSG-RAN WG1 Meeting #80, Athens, Geece, Feb. 9, 2015. pp. 1-6, R1-150431, 3GPP.

Chinese Office Action with English Translation dated Mar. 16, 2021 for Application No. 201680026827.7, consisting of 16-pages.

* cited by examiner

US 11,316,637 B2

PHYSICAL RESOURCE BLOCK ALLOCATION OF PHYSICAL DOWNLINK CONTROL AND DATA CHANNELS

TECHNICAL FIELD

The present disclosure relates generally to downlink transmissions to a wireless device and, more specifically, to allocation of physical resource blocks of physical downlink control channel and data channel for downlink transmissions to a wireless device.

BACKGROUND

Machine-Type Communication (MTC) is an important revenue stream for operators and has a huge potential from the operator perspective. It is efficient for operators to be able to serve MTC User Equipment (UEs) (also referred to as MTC devices in the present application) using already deployed radio access technology. Therefore 3GPP Long-Term Evolution (LTE) has been investigated as a competitive radio access technology for efficient support of MTC operation. Lowering the cost of MTC UEs is an important enabler for implementation of the concept of "internet of things". Many MTC applications require low operational UE power consumption and are expected to communicate with infrequent small burst transmissions. In addition, there is a substantial market for the machine-to-machine (M2M) use cases of MTC devices deployed deep inside buildings which would require coverage enhancement in comparison to the defined LTE cell coverage footprint.

3GPP LTE Rel-12 has defined a UE power saving mode allowing long battery lifetime and a new UE category allowing reduced modem complexity. In Rel-13, more MTC development is expected to further reduce UE cost and provide coverage enhancement. See Reference [4]. The key element to cost reduction is reducing the bandwidth of the UEs to 1.4 MHz in downlink and uplink within any system bandwidth (reference [4]). These low-cost UEs with a reduced bandwidth are referred herein as low-complexity UEs or low-complexity devices.

In LTE, the total system bandwidth can be up to 20 MHz and the total bandwidth is divided into physical resource blocks (PRBs) of 180 kHz. The low-complexity UEs with reduced UE bandwidth of 1.4 MHz to be introduced in LTE Rel-13 may or will not be able to receive the total system bandwidth of 20 MHz. A low-complexity UE may or will only be able to receive up to 6 PRBs (180 kHz×6=1.4 MHz)—only a fraction of the total system bandwidth—at a time. Here we refer to a group of 6 PRBs as a 'PRB group' although a PRB group may consists of either fewer or more PRBs than 6.

In order to achieve the coverage targeted in LTE Rel-13 for low-complexity UEs and other UEs operating delay tolerant MTC applications (see reference [4]), it is expected that time repetition techniques such as subframe bundling (also known as Transmit Time Interval (TTI) bundling) and soft combining should still be utilized in order to allow energy accumulation of the received signals at the UE side, especially during retransmission in an HARQ method.

In a normal HARQ method used in the current 3GPP specification, a transmitter computes a cyclic redundancy check (CRS) and encodes the data with a forward error correction (FEC) code. In the receiver the FEC code is decoded and the quality of the data packet is checked. If there are errors in the data packet, a retransmission of the data is requested. The erroneous data is discarded and retransmission uses the same or a different FEC code as during the first transmission.

For physical data channels, for example, physical downlink shared channel (PDSCH) and physical uplink shared channel (PUSCH), subframe bundling can be used to send a transport block multiple times in consecutive subframes without waiting for HARQ ACK/NACK messages. A transport block may be seen as header followed by a payload and also optionally also padding. The payload is received from higher layers, such as a higher logical layer. Normally, a transport block is converted to multiple redundancy versions after coding and the first redundancy version is sent in a subframe. Subsequent transmissions of the transport block are dependent on the HARQ ACK/NACK. In subframe bundling, the different redundancy versions can be sent in consecutive subframes without waiting for the HARQ ACK/NACK feedback and a combined ACK/NACK can be sent by a receiver or recipient e.g. UE, after processing all the transmissions of a transport block. When subframe bundling is applied, each HARQ (re)transmission consists of a bundle of multiple subframes instead of just a single subframe. Repetition over subframes can also be applied to physical control channels.

Another time repetition technique is the so-called soft-combining. A receiver can store the erroneous packet and combine the erroneous packet with a retransmitted packet.

There is a need to effectively handle communication techniques relating to communication with devices that may be subject to multiple repetitions of data and/or control information.

SUMMARY

The present application discloses methods and apparatus for selecting which physical resource block (PRB) for a physical downlink control channel for e.g. narrow band MTC operation in LTE, by selecting a PRB group used for a physical downlink control channel such as a low complexity physical downlink control channel (LC-PDCCH). In addition, to allow soft combining, the PDSCH frequency location may be implicitly or explicitly given so that it can be soft combined without decoding the physical downlink control channel e.g. LC-PDCCH.

In some embodiments, a narrow-band MTC device is configured to operate in a legacy LTE system with wider system bandwidth and to obtain configuration of LC-PDCCH at the initialization. The MTC device is configured to soft combine LC-PDCCH for better performance and to soft combine PDSCH with implicit or explicit knowledge of the PDSCH allocation from the LC-PDCCH configuration.

In some embodiments, a method performed by a base station for scheduling data transmission to a wireless device and for transmitting data to the wireless device is disclosed. The method comprises allocating a first physical resource block, PRB, group for a physical downlink control channel and signaling an indication of a frequency location of the first PRB group for the physical downlink control channel to the wireless device and transmitting the physical downlink control channel in the allocated first PRB group to the wireless device and transmitting a physical downlink shared channel in a second PRB group that is allocated for the physical downlink shared channel to the wireless device.

In some embodiments, a method for receiving, by a wireless device, transmissions from a base station is disclosed. The method comprises receiving an indication of a frequency location of a first physical resource block, PRB, group from the base station and receiving a physical downlink control channel transmitted in the first PRB group from the base station and receiving a physical downlink shared channel transmitted in a second PRB group from the base station.

In some embodiments a base station for scheduling data transmission for a wireless device and transmitting data to the wireless device is disclosed. The base station comprises allocating means for allocating a first physical resource block, PRB, group for a physical downlink control channel and a transceiver configured to signal an indication of a frequency location of the first PRB group for the physical downlink control channel to the wireless device and wherein the transceiver is further configured to transmit the physical downlink control channel in the allocated first PRB group to the wireless device and wherein the transceiver is further configured to transmit a physical downlink shared channel in a second PRB group that is allocated for the physical downlink shared channel to the wireless device.

In some embodiments, a wireless device for receiving transmissions from a base station is disclosed: The wireless device comprises a transceiver configured to receive an indication of a frequency location of a first physical resource block, PRB, from the base station and wherein the transceiver is further configured to receive a physical downlink control channel transmitted in the first PRB group from the base station and wherein the transceiver is further configured to receive a physical downlink shared channel transmitted in a second PRB group from the base station.

In some embodiments, a method for scheduling and transmitting data to a wireless device, for example, machine-type communication (MTC) device, comprises allocating one or more physical resource blocks of a physical downlink control channel. The method further comprises transmitting the physical downlink control channel in the allocated one or more physical resource blocks to the wireless device and transmitting the physical downlink shared channel in one or more physical resource blocks allocated for the physical downlink shared channel. The frequency location of the physical resource blocks for the control channel indicates the frequency location of the physical resource blocks for the shared channel.

In some embodiments, an apparatus is configured to schedule data transmission and transmit data to a wireless device. The apparatus comprises a transceiver and one or more processing circuits. The transceiver is configured for transmitting signals to the wireless device. The one or more processing circuits comprise an IO interface and an allocation module. The allocation module is configured to allocate one or more physical resource blocks of a physical downlink control channel. The IO interface is configured to transmit, via the transceiver, the physical downlink control channel and the physical downlink shared channel in two different sets of physical resource blocks. The frequency location of the physical resource blocks for the physical downlink control channel indicates the frequency location of the physical resource blocks for the physical downlink shared channel.

In some embodiments, a wireless device is configured to receive transmissions from a base station. The wires device comprises a transceiver and one or more processing circuits. The transceiver is configured for receiving signals from the base station. The one or more processing circuits comprise a decoder. The decoder is configured to receive from the base station a physical downlink control channel transmitted in a first set of physical resource blocks. The decoder is further configured to receive from the base station a physical downlink shared channel transmitted in a second set of physical resource blocks. The frequency location of the first set of physical resource blocks indicates the frequency location of the second set of physical resource blocks.

DETAILED DESCRIPTION

Figure 1:
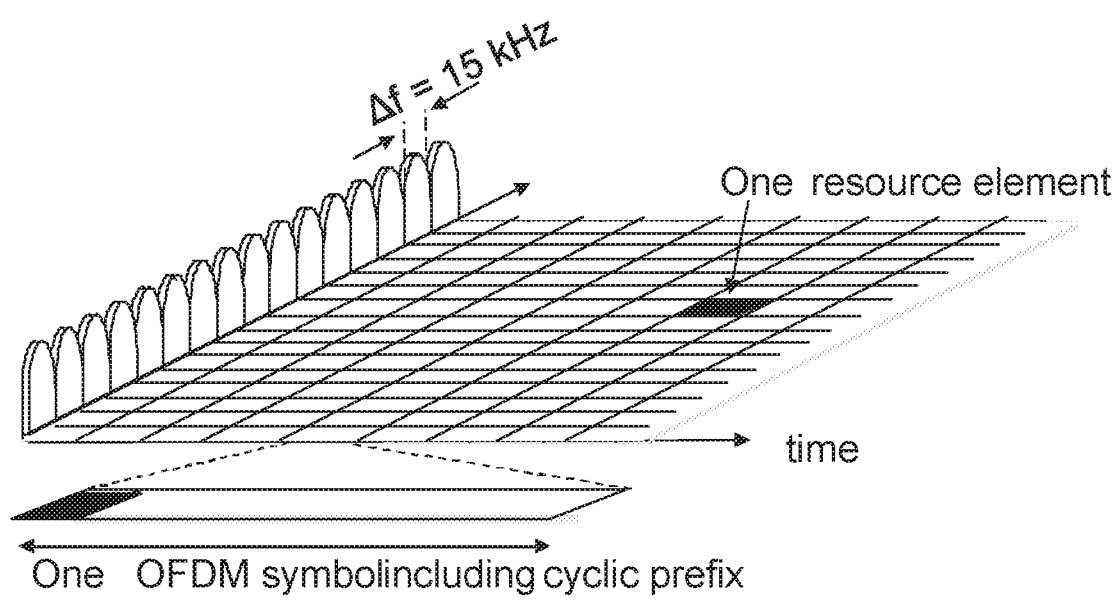
FIG. 1 illustrates an LTE downlink physical resource block.

As illustrated in FIG. 1, LTE uses OFDM in the downlink and DFT-spread OFDM in the uplink. The basic LTE downlink physical resource can thus be seen as a time-frequency grid, where each resource element corresponds to one OFDM subcarrier during one OFDM symbol interval.

In the present application, MTC devices are used as an example in discussions and descriptions. The methods and apparatus disclosed herein are equally applicable to other types of wireless devices. The wireless devices may operate in a bandwidth narrower than the system bandwidth. In the present application, a wireless device that operates in a narrower bandwidth than the system bandwidth is also referred to as a low-complexity UE. A wireless device, as referred to herein, may refer to a machine-to-machine (M2M) device, a machine-type communications (MTC) device, and/or a NB-IoT device. The wireless device may also be a UE, however it should be noted that the UE does not necessarily have a "user" in the sense of an individual person owning and/or operating the device. A wireless device may also be referred to as a radio device, a radio communication device, a wireless terminal, or simply a terminal—unless the context indicates otherwise, the use of any of these terms is intended to include device-to-device UEs or devices, machine-type devices or devices capable of machine-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), etc. In the discussion herein, the terms machine-to-machine (M2M) device, machine-type communication (MTC) device, wireless sensor, and sensor may also be used. It should be understood that these devices may be UEs, but are generally configured to transmit and/or receive data without direct human interaction.

Also, in some embodiments generic terminology, base station is used. It can be any kind of network node, which may be a radio base station, Node B, base station (BS), multi-standard radio (MSR) radio node such as MSR BS, evolved Node B (eNB), network controller, radio network controller (RNC), base station controller (BSC), relay node, relay donor node controlling relay, base transceiver station (BIS), access point (AP), radio access point, transmission points, transmission nodes, Remote Radio Unit (RRU), Remote Radio Head (RRH), nodes in distributed e a system (DAS), Multi-cell/multicast Coordination Entity (MCE), core network node e.g., MSC, MME etc), O&M, OSS, SON, positioning node (e.g., E-SMLC), MDT, or any suitable network node.

In the present application, LTE system is used as an example in discussions and descriptions. However, the methods and apparatus disclosed herein can be used in any wireless communication system that employs a time frequency paid.

Transmissions on LTE physical data channels (PDSCH, PUSCH) are typically scheduled using downlink control information (DCI) in a physical downlink control channel. For low-complexity wireless devices with reduced bandwidth, the physical downlink control channel bandwidth may not be larger than for example 6 PRBs. Here we refer to the physical downlink control channel supporting low-complexity wireless devices and enhanced coverage as 'LC-PDCCH.'

LTE wireless devices or devices supporting Enhanced Physical Downlink Control Channel (EPDCCH) can be configured to monitor EPDCCH in addition to PDCCH (references [1] and [2]). Whereas PDCCH spans the entire system bandwidth, EPDCCH only spans a small number of PRBs, which suggests that the EPDCCH design may be a suitable starting point or basis for the LC-PDCCH.

For each serving cell, higher layer signalling can configure a wireless device with one or two EPDCCH-PRB-sets for EPDCCH monitoring. Each EPDCCH-PRB-set consists of set of Enhanced Control Channel Elements (ECCEs) numbered from 0 to $N_{ECCE,p,k}-1$ where $N_{ECCE,p,k}$ is the number of ECCEs in EPDCCH-PRB-set p of subframe k. Each EPDCCH-PRB-set can be configured for either localized EPDCCH transmission or distributed EPDCCH transmission.

The wireless device shall monitor a set of EPDCCH candidates on one or more activated serving cells as configured by higher layer signalling for control information, where monitoring implies attempting to decode each of the EPDCCHs in the set according to the monitored DCI formats.

The set of EPDCCH candidates to monitor are defined in terms of EPDCCH wireless device-specific search spaces. For each serving cell, the subframes in which the wireless device monitors EPDCCH wireless device-specific search spaces are configured by higher layers (reference [3]).

In order to achieve the coverage targeted in LTE Rel-13 for low-complexity wireless devices and other wireless devices operating delay tolerant MTC applications (reference [4]), a physical downlink control channel with sufficient coverage needs to be available. This physical downlink control channel can for example be a modified version of the legacy EPDCCH with additional time repetitions over several subframes in order to allow energy accumulation at the wireless device side.

For maximum performance the wireless device should be able to aggregate all transmissions of both LC-PDCCH and/or PDCCH within a repetition window. With time multiplexed and possibly time interleaved transmissions of the physical downlink control channels and PDSCH, the wireless device will need to aggregate PDSCH even before having decoded the physical downlink control channel. Then, methods for allocating a wireless device to a specific PRB group for decoding LC-PDCCH and PDSCH need to be defined.

The application discloses embodiments for selecting a group of physical resource blocks to transmit LC-PDCCH and for allocating PRB groups with flexible locations for transmitting PDSCH.

Figure 2:
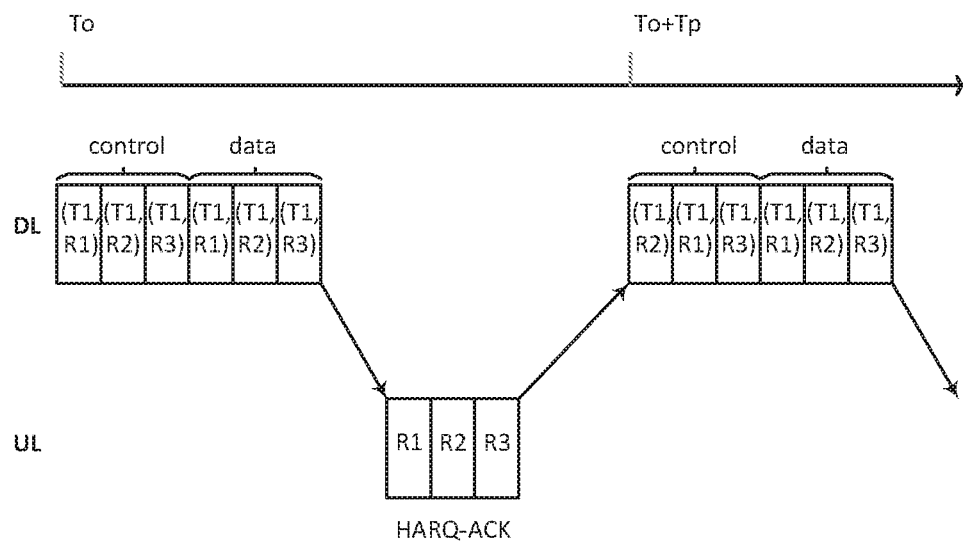
FIG. 2 illustrates operation HARQ with time multiplexed control channels e.g. PDCCH and data channels e.g. PDSCH.

A general transmissions scheme for transmitting control information and data to a wireless device is shown in FIG. 2. According to some exemplary embodiments, in order to allow the wireless device to identify which PDSCH PRBs to do soft combining (HARQ combining) over, the PRB group location of the PDSCH may be predefined. This means that the DCI does not need to contain PDSCH PRB group info, but may contain other info related to PDSCH scheduling. Even if the associated LC-PDCCH fails, the wireless device can figure out the PDSCH PRB group location and knows what received symbols to store for combining with future retransmission for both LC-PDCCH and PDSCH. LC-PDCCH can be soft combined based on how the wireless device is configured. PDSCH can be combined based on the knowledge of which PRB group to store in each subframe.

The PRB group used for LC-PDCCH can be the same as or correspond to the PRB group for PDSCH, or there can be a predefined relationship between the PRB group location of LC-PDCCH and that of PDSCH. The same PRB group may mean that the search for the data channel in the same frequency location as the control channel but only after a time period later, as shown in FIG. 2. FIG. 2 shows the control channel being sent in three instances followed by three instances of the data channel. In the case that the wireless device is not able to decode the control channel, the wireless device can store or buffer the three instances of the data channel. The wireless device may then transmit a NACK or (ACK) to the eNB or base station transmitter indicating that it was unable to decode properly. The bases station or transmitter may then retransmit the control information and maybe followed by a retransmission of the data channel at time $T_0+T_p$. If the wireless device could decode the control channel the wireless device may then combine the data channel transmitted the first time at $T_0$ with the data channel transmitted the second time $T_0+T_p$. This operation would not be possible if the location of the data channel is transmitted only as information within the control channel.

There are at least two methods that may be used for selecting the PRB group for a control channel such as the LC-PDCCH. The first method is semi-static signaling of the LC-PDCCH PRB group. After initial access, the network signals, e.g. using RRC signaling [3], to the wireless device which PRB group the wireless device should monitor for potential LC-PDCCH transmissions intended for the wireless device. The wireless device therefore receives an indication of a frequency location of a PRB group from the base station wherein the wireless device may monitor of find the control channel e.g. LC-PDCCH. On the same note the base station may signal an indication of a frequency location of the PRB group for the physical downlink control channel to the wireless device. The frequency location of the PRB group containing the control channel may be referred to as the first PRB group. A frequency location may be defined by a center frequency or a logical number representing a frequency location in relation to a system bandwidth or any other way that lets the wireless device known to which frequency to tune its receiver.

The second method that may be used for selecting the PRB group for a control channel such as the LC-PDCCH comprises a deterministic selection of the PRB group for the control channel with possible time variation. The base station signals an indication of a set of PRB groups and wherein the method further comprises allocating in a deterministic way which PRB group out of the set is the first PRB group. A set of PRB groups are indicated either in system information or signaled on per wireless device basis. The wireless device may then select in a deterministic way which PRB group it decodes the control channel such as the LC-PDCCH. The deterministic selection may for example be based on its C-RNTI. The C-RNTI may be used as input to a function that in turn indicates the frequency location of the PRB for decoding the control channel. Additionally, the PRB group for LC-PDCCH for a certain wireless device could vary deterministically over time in order to avoid blocking between wireless devices ending up with the same PRB group. For example, this could be done using a hashing function.

As shown below, the PRB group frequency location of PDSCH may or may not be the same as the LC-PDCCH that schedules it.

There are two options of selecting the PRB group frequency location of the PDSCH. As described below, the PRB group frequency location of PDSCH may or may not be the same as the LC-PDCCH that schedules it. The first option is to choose the same PRB group location of PDSCH as the associated LC-PDCCH. In this option, it is defined that the PRB group occupied by scheduled PDSCH transmission is the same as the PRB group of the associated LC-PDCCH transmission. This is necessary in cases when it is desired that the first subframe of a PDSCH bundle follows immediately after the last subframe of the associated LC-PDCCH bundle, since the wireless device's center frequency returning to a different PRB group within the DL system bandwidth requires some time.

The second option is to choose a flexible PRB group location of PDSCH. If there is a guard subframe between LC-PDCCH and PDSCH, the PDSCH PRB group location does not need to be the same as that of the associated LC-PDCCH transmission.

The guard subframe may be configured to be long enough for both LC-PDCCH processing and retuning to another frequency location within the DL system bandwidth. The retuning time is estimated to be approximately 200 microseconds in a typical wireless device implementation.

The PDSCH PRB group frequency location may have a predefined frequency-domain offset relationship with the PRB group location of the associated LC-PDCCH transmission so that the wireless device receiver knows which PDSCH PRB group to buffer even if LC-PDCCH decoding is not successful (i.e. LC-PDCCH CRC check fails). In one embodiment, the predefined offset is provided by a frequency hopping pattern that governs both LC-PDCCH and PDSCH.

In one embodiment, both the first and second options of selecting the PRB group frequency location of PDSCH are applied. It is up to the eNB or base station to signal which option to use. Higher layer signaling can be used for this purpose. For example, the first option is used for low-load cell and/or half-duplex wireless device, while the second option is used in high-load cell to reduce collision and/or increase capacity.
To ensure the same HARQ timeline for all scenarios, if both the first and second options are needed, one solution may be to make the first option a special case of the second option.

Even if no retuning is needed (i.e., the same PRB group is used for PDSCH and its associated LC-PDCCH), one 'guard subframe' can be inserted between the end of the LC-PDCCH bundle and the beginning of the PDSCH bundle. The inserted guard subframe can be used for another HARQ process of the same wireless device or a different wireless device. The insertion of a guard period (e.g. a guard subframe) may be between the LC-PDCCH transmission and the following PDSCH transmission.

FIG. 3 illustrates an exemplary embodiment or process of scheduling data transmission for or to a wireless device and for transmitting data to the wireless device. In a step 301 of the process, one or more physical resource blocks such as a first PRB group are allocated for a physical downlink control channel. The base station is thus allocating a first PRB group for a physical downlink control channel. In some embodiments, the one or more physical resource blocks are a group of six physical resource blocks. In some embodiments, the one or more physical resource blocks are allocated based on a pre-determined scheme. The pre-determined scheme may specify the one or more physical resource blocks in the physical downlink control channel and the specified one or more physical resource blocks are signaled to the wireless device, for example, after initial access. The wireless device may monitor the one or more physical resource blocks for downlink transmissions intended for the wireless device. In some embodiments, the pre-determined scheme comprises a method of determining the one or more physical resource blocks. In one embodiment, the one or more physical resource blocks are determined using the wireless device's cell radio network temporary identifier.

In another step 302 of the process shown in FIG. 3, the base station signals an indication of a frequency location of the first PRB group for the physical downlink control channel to the wireless device.

In another step 303 of the process shown in FIG. 3, the physical downlink control channel is transmitted in the allocated one or more physical resource blocks or allocated first PRB group to the wireless device. The base station is thus transmitting the physical downlink control channel in the allocated first PRB group to the wireless device. In a another step 304 of the process shown in FIG. 3, a physical downlink shared channel is transmitted in one or more physical resource blocks or to the wireless device. The base station is thus transmitting a physical downlink shared channel in a second PRB group that is allocated for the physical downlink shared channel to the wireless device. Step 304 may include that the frequency location of the physical resource blocks or PRB group for the physical downlink control channel may indicate the frequency location of the physical resource blocks or PRB group for the physical downlink shared channel.

Figure 3A:
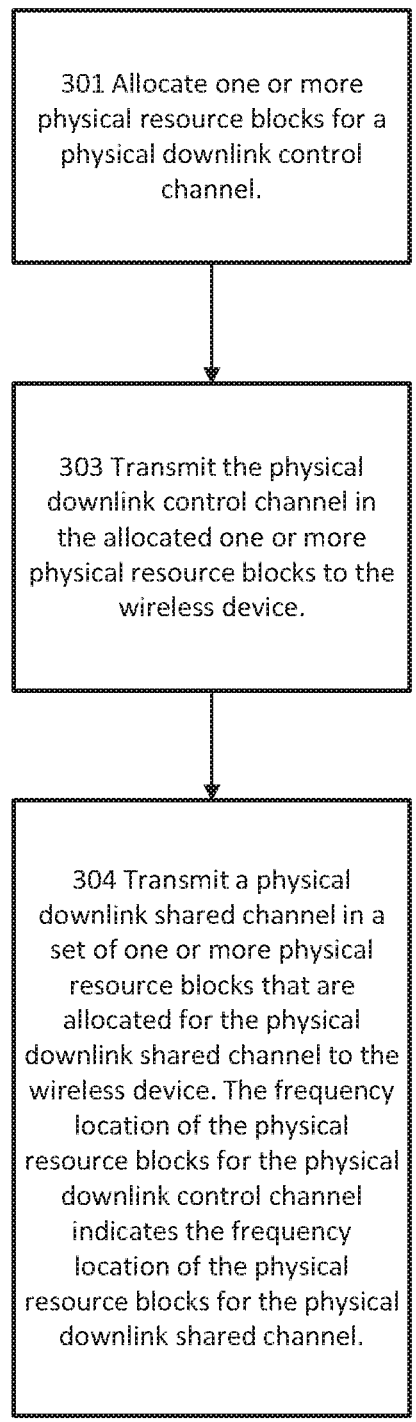
FIG. 3a-b illustrates a flowchart of exemplary process of allocation PRBs for control channel such as LC-PDCCH and data channels such as PDSCH for wireless devices.
Figure 3B:
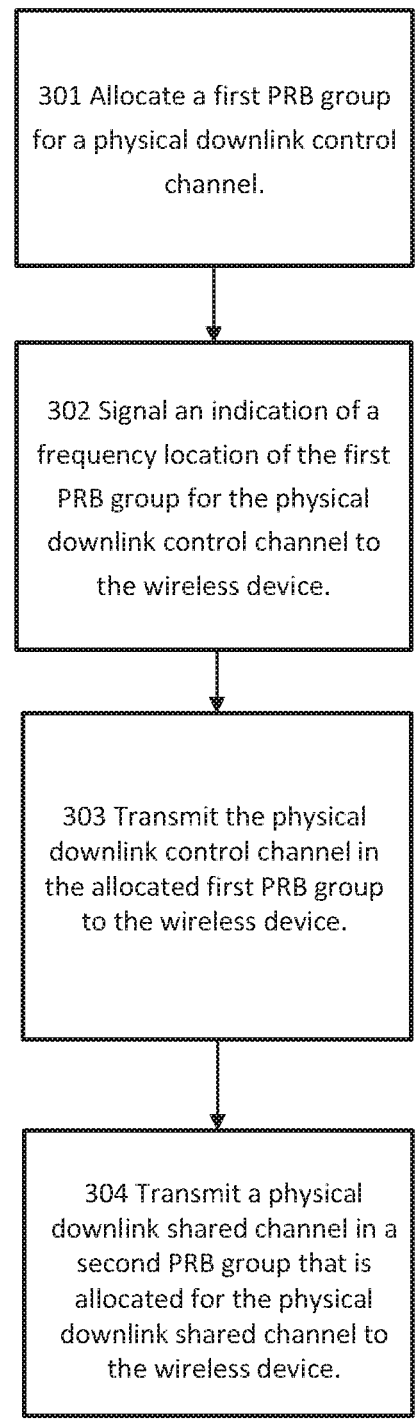
Figure 4:
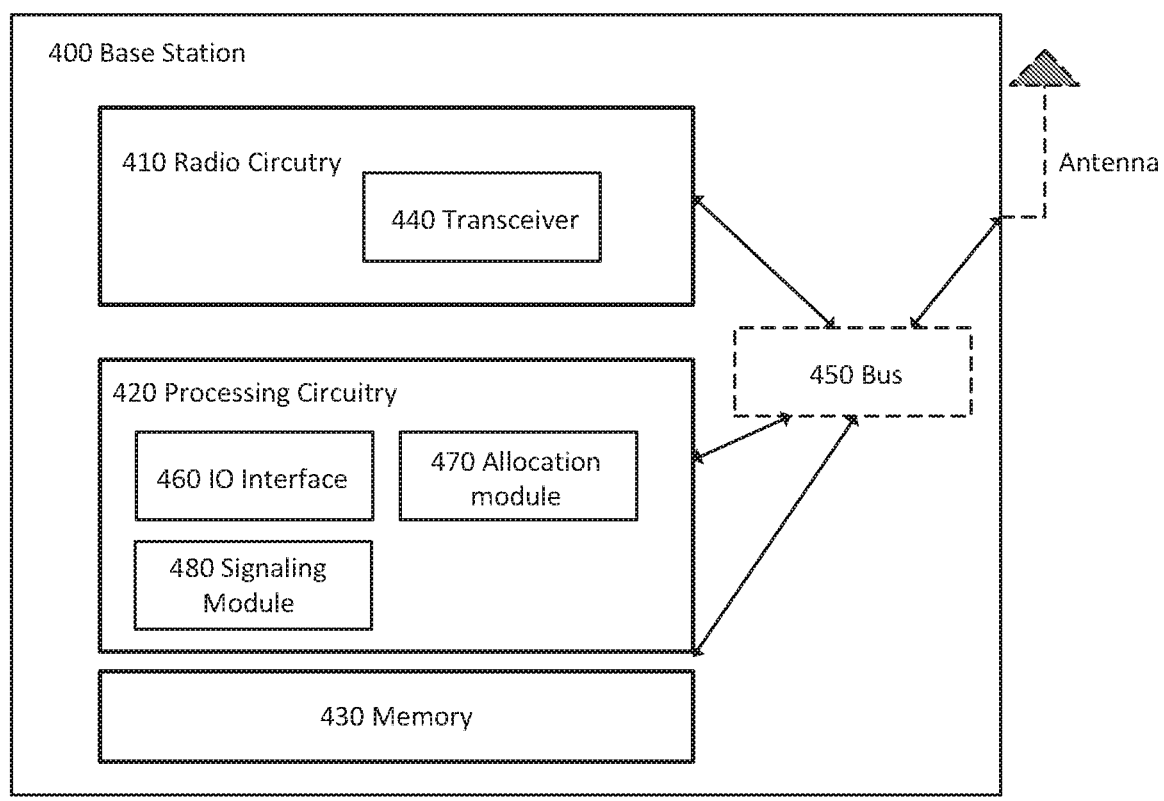
FIG. 4 illustrates an exemplary base station configured to allocate control channel such as LC-PDCCH and data channels such as PDSCH PRBs for downlink transmissions to wireless devices.

The exemplary process described in FIGS. 3a-b for scheduling data transmissions to or for a wireless device and for transmitting data to a wireless device may be implemented in an eNB or a base station. FIG. 4 illustrates exemplary apparatuses such as the eNB or base station for scheduling data transmissions for a wireless device and transmitting data to the wireless device.

As shown in FIG. 4, the example base station 400 includes processing circuitry or equivalently processing circuits 420, a memory 430, radio circuitry 410, optionally communication bus 450 and optionally at least one antenna. The radio circuitry may comprise RF circuitry including transceiver 440, the RF front-end circuitry, such as various filters, amplifiers, oscillators, and mixers, as well as RF transceiver circuitry (not shown). The processing circuitry may include baseband processing circuitry and, in some embodiments, application processing circuitry as well (not shown). In one embodiment the processing circuitry contains an IO interface 460 wherein the IO interface is configured to transmit the physical downlink control channel in the allocated one or more physical resource blocks to the wireless device, and also transmit a physical downlink shared channel in a set of one or more physical resource blocks allocated for the physical downlink shared channel to the wireless device. The transmission using the IO interface may be used in combination with the radio circuitry. In one embodiment the processing circuitry contains an allocation module 470 wherein the allocation module is configured to allocate one or more physical resource blocks for a physical downlink control channel. In one embodiment the processing circuitry contains an signaling module 480 wherein the signaling module 480 is configured to signal an indication of a frequency location of the first PRB group for the physical downlink control channel to a wireless device. In alternative embodiments, part or all of the baseband processing circuitry and application processing circuitry may be combined. In other alternative embodiments, part or all of the radio circuitry, baseband processing circuitry, and application processing circuitry may be combined. The communication bus 450 may enable communication between components within the base station. In particular embodiments, some or all of the functionality described herein as being provided by a base station may be provided by the processing circuitry 420 executing instructions stored on a computer-readable medium, such as the memory 430 shown in FIG. 4, or may be provided by the processing circuitry 420 in some other manner such as in a hard-wired manner. In any of those particular embodiments, the processing circuitry can be said to be configured to perform the described functionality. Alternative embodiments of the base station 400 may include additional components beyond those shown in FIG. 4 that may be responsible for providing certain aspects of the base station's functionality, including any of the functionality described herein and/or any functionality necessary to support the solution described above.

As just one example, base station 400 may include input interfaces, devices and circuits, and output interfaces, devices and circuits. Input interfaces, devices, and circuits include mechanisms for entry of information into base station 400. For example, input interfaces, devices, and circuits may include a microphone, a proximity or, other sensor, keys/buttons, a touch display, one or more cameras, a USB port, or other input elements. Output interfaces, devices, and circuits may include mechanisms for outputting information from base station 400. For example, output interfaces, devices, or circuits may include a speaker, a display, vibrating circuitry, a USB port, a headphone interface, or other output elements.

As another example, base station 400 may include a battery or other power supply circuitry, as well as power management circuitry. Base station may also include multiple sets of processing circuitry 420, memory 430, radio circuitry 410, and/or antenna for different wireless interface technologies, such as, for example, GSM, WCDMA, LTE, WiFi, or Bluetooth wireless interface technologies.

In some embodiments, processing circuitry 420 may include, for example, one or more central processing units (CPUs), one or more microprocessors, one or more application specific integrated circuits (ASICs), and/or one or more field programmable gate arrays (FPGAs).

Memory 430 is generally operable to store instructions, such as a computer program, software, an application including one or more of logic, rules, algorithms, code, tables, etc. and/or other instructions capable of being executed by a processor. Examples of memory 430 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or Instructions that may be used by processing circuitry 420. In some embodiments, processing circuitry 420 and memory 430 may be considered to be integrated.

Figures 5A, 5B:
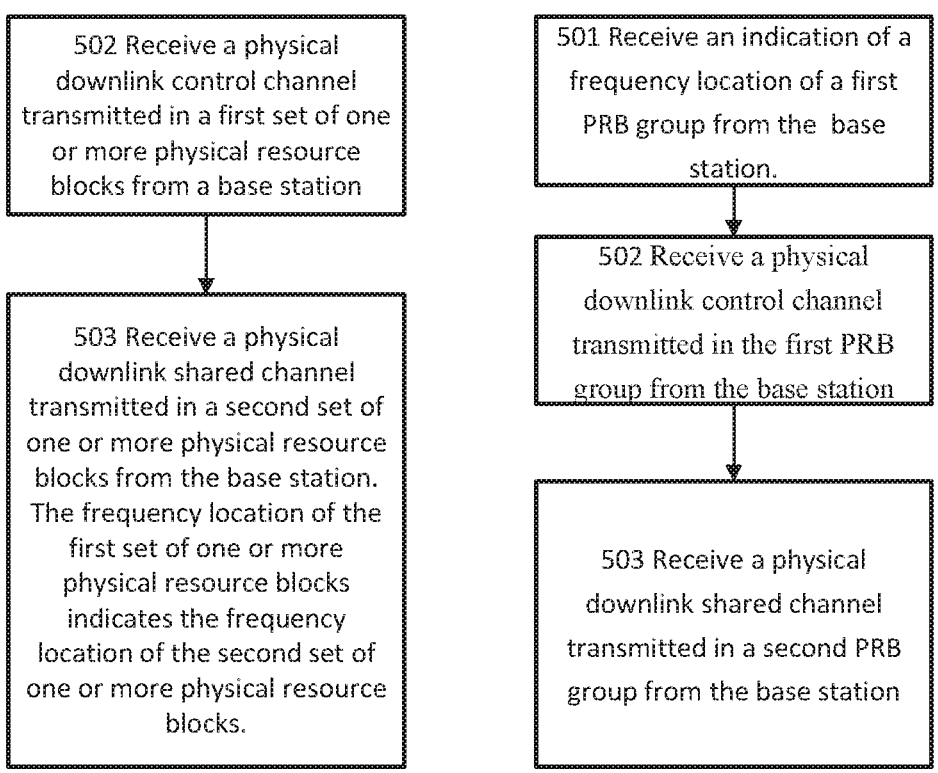
FIG. 5a-b illustrates exemplary processes for receiving and decoding data transmitted in control channel such as LC-PDCCH and data channels such as PDSCH PRBs.

FIG. 5a-b illustrates exemplary embodiments or processes of receiving data from a base station by a wireless device. The embodiments or processes may be combined with any of the disclosure herein relating to the wireless device and/or the embodiments relating to the base station. In the process, the wireless device receives 501 an indication of a frequency location of a first PRB group from the base station. The wireless device also receives 502, from the base station, a physical downlink control channel transmitted in the first PRB group which may be a first set of physical resource blocks. The wireless device also receives 503, from the base station, a physical downlink shared channel transmitted in a second PRB group which may be second set of physical resource blocks. In addition, the frequency location of the first set of physical resource blocks may indicate the second set of physical resource blocks. Alternatively the frequency location of the first PRB group indicates the second PRB group. In some embodiments the wireless device can derive the frequency location of the first PRB group from the frequency location of the second PRB group. In some embodiments, the wireless device can derive the frequency location of the second set of physical resource blocks from the frequency location of the first set of physical resource blocks. The wireless device may receive the second set of physical resource blocks or second PRB group without decoding the data in the first set of physical resource blocks.

Figure 6:
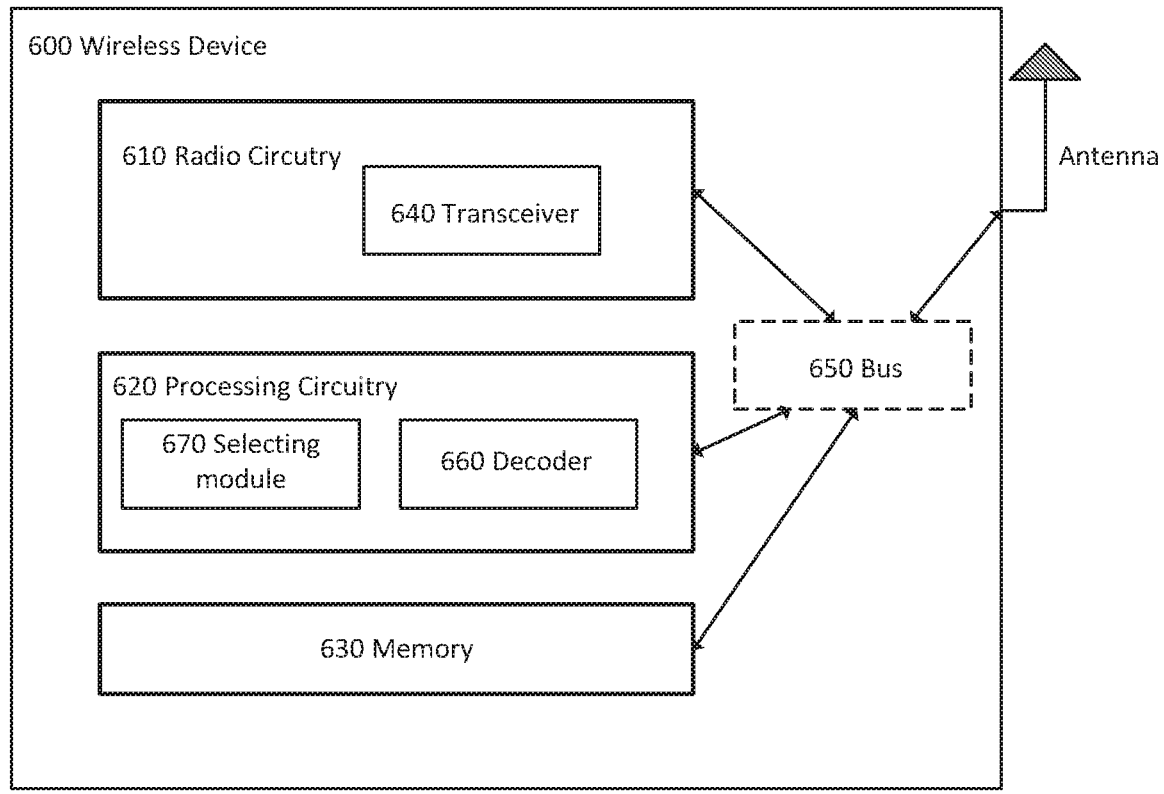
FIG. 6 illustrates an exemplary wireless device for receiving and decoding data transmitted in control channel such as LC-PDCCH and data channels such as PDSCH PRBs.

FIG. 6 illustrates an exemplary wireless device at is configured to carry out the process described in FIGS. 5a-b As shown in FIG. 6, the example wireless device 600 includes processing circuitry or equivalently processing circuits 620, a memory 630, radio circuitry 610, optionally communication bus 650 and at least one antenna. The radio circuitry may comprise RF circuitry including transceiver 640, the RF front-end circuitry, such as various filters, amplifiers, oscillators, and mixers, as well as RF transceiver circuitry (not shown). The processing circuitry may include baseband processing circuitry and, in some embodiments, application processing circuitry as well (not shown). In one embodiment the processing circuitry contains a decoder 660 for decoding signals such as this received on control and or/data channels. In one embodiment the processing circuitry contains a selecting module 670 for selecting a PRB group as described herein. In alternative embodiments, part or all of the baseband processing circuitry and application processing circuitry may be combined. In other alternative embodiments, part or all of the radio circuitry, baseband processing, circuitry, and application processing circuitry may be combined. The communication bus may enable communication between components within the wireless device. In particular embodiments, some or all of the functionality described herein as being provided by a wireless device may be provided by the processing circuitry 620 executing instructions stored on a computer-readable medium, such as the memory 630 shown in FIG. 6, or may be provided by the processing circuitry 620 in some other manner such as in a hard-wired manner. In any of those particular embodiments, the processing circuitry can be said to be configured to perform the described functionality. Alternative embodiments of the wireless device 600 may include additional components beyond those shown in FIG. 6 that may be responsible for providing certain aspects of the wireless device's functionality, including any of the functionality described herein and/or any functionality necessary to support the solution described above.

As just one example, wireless device 600 may include input interfaces, devices and circuits, and output interfaces, devices and circuits. Input interfaces, devices, and circuits include mechanisms for entry of information into wireless device 600. For example, input interfaces, devices, and circuits may include a microphone, a proximity or other sensor, keys/buttons, a touch display, one or more cameras, a USB port, or other input elements. Output interfaces, devices, and circuits may include mechanisms for outputting information from wireless device 600. For example, output interfaces, devices, or circuits may include a speaker, a display, vibrating circuitry, a USB port, a headphone interface, or other output elements.

As another example, wireless device 600 may include a battery or other power supply circuitry, as well as power management circuitry. Wireless device may also include multiple sets of processing circuitry 620, memory 630, radio circuitry 610, and/or antenna for different wireless interface technologies, such as, for example, GSM, WCDMA, LTE, WiFi, or Bluetooth wireless interface technologies.

In some embodiments, processing circuitry 620 may include, for example, one or more central processing units (CPUs), one or more microprocessors, one or more application specific integrated circuits (ASICs), and/or one or more field programmable gate arrays (FPGAs).

Memory 630 is generally operable to store instructions, such as a computer program, software, an application including one or more of logic, rules, algorithms, code, tables, etc. and/or other instructions capable of being executed by a processor. Examples of memory 630 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by processing circuitry 620. In some embodiments, processing circuitry 620 and memory 630 may be considered to be integrated.

The present invention may be carried out in other specific ways than those herein set forth without departing from the scope and essential characteristics of the invention. One or more of the specific processes discussed above may be carried out in a cellular phone or other communications transceiver comprising one or mole appropriately configured processing circuits, which may in some embodiments be embodied in one or more application-specific integrated circuits (ASICs). In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive, and all changes coming within the meaning and equivalency range of the appended claims are intended to be embraced therein.

In the following are exemplary embodiments according to some of the embodiments as though herein A method for scheduling data transmission for a wireless device and transmitting data to the wireless device, comprising allocating one or more physical resource blocks for a physical downlink control channel and transmitting the physical downlink control channel in the allocated one or more physical resource blocks to the wireless device and transmitting a physical downlink shared channel to the wireless device in a set of one or more physical resource blocks that are allocated for the physical downlink shared channel. The one or more physical resource blocks for the physical downlink control channel or the one or more physical resource blocks for the physical downlink shared channel may be a group of six physical resource blocks. The one or more physical resource blocks for the physical downlink control channel may be allocated according to a pre-determined scheme shared with the wireless device, wherein the pre-determined scheme specifies the one or more physical resource blocks for the physical downlink control channel, and wherein the pre-determined scheme may be shared with the wireless device by signaling the one or more physical resource blocks to the wireless device for the wireless device to monitor downlink transmissions intended for the wireless device. The one or more physical resource blocks for the physical downlink control channel may be allocated according to a pre-determined scheme shared with the wireless device, wherein the pre-determined scheme comprises a method of determining the one or more physical resource blocks, and wherein the pre-determined scheme is shared with the wireless device by signaling an indication of the method to the wireless device for the wireless device to determine the one or more physical resource blocks for monitoring. The determining of the one or more physical resource blocks for the physical downlink control channel may comprise determining the one or more physical resource blocks based on a cell radio network temporary identifier (C-RNTI) of the wireless device. The one or more physical resource blocks for the physical downlink shared channel may be of the same frequency as the one or more physical resource blocks for the physical downlink control channel. The one or more physical resource blocks for the physical downlink shared channel may be offset by a pre-defined frequency domain offset from the one or more physical resource blocks for the physical downlink control channel.

An apparatus configured to schedule and transmit data to a wireless device. Said apparatus comprises a transceiver configured for transmitting signals to the wireless device and one or more processing circuits comprising an allocation module for allocating one or more physical resource blocks for a physical downlink control channel and for allocating one or more physical resource blocks for a physical downlink shared channel. The apparatus further comprises an input/output module configured to transmit, via the transceiver, the physical downlink control channel in the allocated one or more physical resource blocks and transmit, via the transceiver, the physical downlink shared channel in the one or more physical resource blocks that are allocated for the physical downlink shared channel to the wireless device. The one or more physical resource blocks for the physical downlink control channel or the one or more physical resource blocks for the physical downlink shared channel may be a group of six physical resource blocks. The one or more physical resource blocks for the physical downlink control channel may be allocated according to a pre-determined scheme shared with the wireless device, and wherein the pre-determined scheme specifies the one or more physical resource blocks for the physical downlink control channel, and wherein the pre-determined scheme is shared with the wireless device by signaling the one or more physical resource blocks to the wireless device for the wireless device to monitor downlink transmissions intended for the wireless device. The one or more physical resource blocks for the physical downlink control channel may be allocated according to a pre-determined scheme shared with the wireless device, wherein the pre-determined scheme comprises a method of determining the one or more physical resource blocks for the physical downlink control channel and wherein the pre-determined scheme is shared with the wireless device by signaling an indication of the method to the wireless device for the wireless device to determine the one or more physical resource blocks for monitoring. When determining the one or more physical resource blocks it may be based on a cell radio network temporary identifier (C-RNTI) of the wireless device. The one or more physical resource blocks for the physical downlink shared channel may be of the same frequency as the one or more physical resource blocks for the physical downlink control channel. The one or more physical resource blocks for the physical downlink shared channel may be offset by a pre-defined frequency domain offset from the one or more physical resource blocks of the physical downlink control channel.

A method for scheduling data transmission for a wireless device and transmitting data to the wireless device comprises allocating one or more physical resource blocks for a physical downlink control channel and transmitting the physical downlink control channel in the allocated one or more physical resource blocks to the wireless device and transmitting a physical downlink shared channel in one or more physical resource blocks that are allocated for the physical downlink shared channel to the wireless device, wherein the frequency location of the one or more physical resource blocks for the physical downlink control channel indicates the frequency location of the one or more physical resource blocks for the physical downlink shared channel.

A method for receiving, by a wireless device, transmissions from a base station, comprises receiving a physical downlink control channel transmitted in a first set of one or more physical resource blocks from the base station and receiving a physical downlink shared channel transmitted in a second set of one or more physical resource blocks from the base station and wherein the frequency location of the first set of one or more physical resource blocks indicates the frequency location of the second set of one or more physical resource blocks. The wireless device may receive data in the second set of one or more physical resource blocks by deriving the frequency location of the second set of physical resource blocks from the frequency location of the first set of physical resource blocks.

A wireless device for receiving transmissions from a base station, comprises a transceiver for receiving signals from the base station and one or more processing circuits comprising a decoder. Said decoder may be configured to receive a physical downlink control channel transmitted in a first set of one or more physical resource blocks from the base station and receive a physical downlink shared channel transmitted in a second set of one or more physical resource blocks from the base station and wherein the frequency location of the first set of one or more physical resource blocks indicates the frequency location of the second set of one or more physical resource blocks. The wireless device may receive data in the second set of physical resource blocks by deriving the frequency location of the second set of the physical resource blocks from the frequency locations of the first set of physical resource blocks.

ABBREVIATIONS

3GPP 3rd Generation Partnership Project
BW Bandwidth
DL Downlink
eNB Enhanced Node-B
EPDCCH Enhance physical downlink control channel
FDD Frequency Division Duplexing
FFT Fast Fourier Transform
HARQ Hybrid ARQ
LC-PDCCH Low-complexity physical downlink control channel
LTE Long term evolution
MCS Modulation and Coding Scheme
MME Mobile Management Entity
MTC Machine Type Communication
PDSCH Physical downlink share channel
PDCCH Physical downlink control channel
PRB Physical Resource Block
PRBG Physical Resource Block Group
PUCCH Physical Uplink Control Channel
PUSCH Physical Uplink Shared Channel
RAR Random access response
RRC Radio resource control
SIB System information block
TDD Time Division Duplexing
TM Transmission mode
UE User Equipment
UL Uplink

BACKGROUND REFERENCES

The content of each of the references listed below is incorporated in the present disclosure in its entirety.
1) 3GPP TS 36.211 V12.4.0, 3rd Generation Partnership Project; Technical Specification Group Radio Access Network; Evolved Universal Terrestrial Radio Access (E-UTRA); Physical channels and modulation (Release 12)
2) 3GPP TS 36.213 V12.4.0, 3rd Generation Partnership Project; Technical Specification Group Radio Access Network; Evolved Universal Terrestrial Radio Access (E-UTRA); Physical layer procedures (Release 12)
3) 3GPP TS 36.331 V12.4.1, 3rd Generation Partnership Project; Technical Specification Group Radio Access Network; Evolved Universal Terrestrial Radio Access (E-UTRA); Radio Resource Control (RRC); Protocol specification (Release-12)
4) 3GPP TR 36.888 v1.2.0.0, Study on provision of low-cost Machine-Type Communications (MTC) User Equipments (UEs) based On LTE (Release 12)
5) 3GPP Tdoc RP-141660, Work Item Description: Further LTE Physical Layer Enhancements for MTC, Ericsson, Nokia Networks

What is claimed is:
1. A method, performed by a base station, for scheduling data transmission to a wireless device and for transmitting data to the wireless device, the method comprising:
allocating a first physical resource block (PRB) group for a physical downlink control channel;

signaling, to the wireless device, an indication of a frequency location of the first PRB group for the physical downlink control channel;
transmitting, to the wireless device, the physical downlink control channel in the allocated first PRB group; and
transmitting, to the wireless device, a physical downlink shared channel, associated with the physical downlink control channel, in a second PRB group that is allocated for the physical downlink shared channel, wherein the transmission of the physical downlink control channel and the transmission of the physical downlink shared channel are separated by a guard period, with the guard period being a subframe.

2. The method of claim 1:
wherein the indication indicates a set of PRB groups;
further comprising allocating in a deterministic way which PRB group out of the set is the first PRB group.

3. The method of claim 1, wherein the frequency location of the first PRB group indicates the frequency location of the second PRB group.

4. The method of claim 1, wherein signaling the indication comprises using radio resource control signaling.

5. The method of claim 1, further comprising:
allocating the second PRB group for the physical downlink shared channel, wherein a frequency location of the second PRB group is based on the frequency location of the first PRB group.

6. The method of claim 1, wherein the first and second PRB groups are in a set of PRB groups, the set having one or more PRB groups allocated for a plurality of physical downlink control channels and one or more PRB groups allocated for a plurality of physical downlink shared channels, with each physical downlink shared channel corresponding to one of the physical downlink control channels.

7. The method of claim 6, wherein the set represents a subframe.

8. The method of claim 6, wherein the PRB groups of the set are contiguous in time and frequency.

9. A method for receiving, by a wireless device, transmissions from a base station, the method comprising:
receiving, from the base station, an indication of a frequency location of a first physical resource block (PRB) group;
receiving, from the base station, a physical downlink control channel transmitted in the first PRB group; and
receiving, from the base station, a physical downlink shared channel associated with the physical downlink control channel and transmitted in a second PRB group, wherein the reception of the physical downlink control channel and the reception of the physical downlink shared channel are separated by a guard period, with the guard period being a subframe.

10. The method of claim 9:
wherein the indication indicates a set of PRB groups;
further comprising selecting, by the wireless device in a deterministic way, which PRB group is the first PRB group.

11. The method of claim 9, wherein the frequency location of the first PRB group indicates the frequency location of the second PRB group.

12. The method of claim 9, wherein the receiving the indication comprises receiving the indication using radio resource control signaling.

13. A base station for scheduling data transmission for a wireless device and transmitting data to the wireless device, the base station comprising:
processing circuitry configured to allocate a first physical resource block (PRB) group for a physical downlink control channel; and
a transceiver configured to:
signal, to the wireless device, an indication of a frequency location of the first PRB group for the physical downlink control channel;
transmit, to the wireless device, the physical downlink control channel in the allocated first PRB group; and
transmit, to the wireless device, a physical downlink shared channel, associated with the physical downlink control channel, in a second PRB group that is allocated for the physical downlink shared channel, wherein the transmission of the physical downlink control channel and the transmission of the physical downlink shared channel are separated by a guard period, with the guard period being a subframe.

14. The base station of claim 13:
wherein the indication indicates a set of PRB groups; and
wherein the processing circuitry is configured to allocate in a deterministic way which PRB group out of the set is the first PRB group.

15. The base station of claim 13, wherein the frequency location of the first PRB group indicates the frequency location of the second PRB group.

16. The base station of claim 13, wherein the transceiver is configured to signal the indication using radio resource control signaling.

17. A wireless device for receiving transmissions from a base station, comprising:
a transceiver configured to:
receive, from the base station, an indication of a frequency location of a first physical resource block (PRB) group;
receive, from the base station, a physical downlink control channel transmitted in the first PRB group; and
receive, from the base station, a physical downlink shared channel associated with the physical downlink control channel and transmitted in a second PRB group, wherein the reception of the physical downlink control channel and the reception of the physical downlink shared channel are separated by a guard period, with the guard period being a subframe.

18. The wireless device of claim 17:
wherein the indication indicates a set of PRB groups; and
wherein the wireless device further comprises processing circuitry configured to select in a deterministic way which PRB group is the first PRB group.

19. The wireless device of claim 17, wherein the frequency location of the first PRB group indicates the frequency location of the second PRB group.

20. The wireless device of claim 17, wherein the transceiver is configured to receive the indication using radio resource control signaling.

* * * * *